US012629843B2

(12) United States Patent
Kang et al.

(10) Patent No.: US 12,629,843 B2
(45) Date of Patent: May 19, 2026

(54) ROBOT AND METHOD FOR CONTROLLING THEREOF

(71) Applicant: Samsung Electronics Co., Ltd.,
Suwon-si (KR)

(72) Inventors: Seongmin Kang, Suwon-si (KR);
Heungwoo Han, Suwon-si (KR)

(73) Assignee: Samsung Electronics Co., Ltd.,
Suwon-si (KR)

( * ) Notice: Subject to any disclaimer, the term of this
patent is extended or adjusted under 35
U.S.C. 154(b) by 149 days.

(21) Appl. No.: 18/318,328

(22) Filed: May 16, 2023

(65) Prior Publication Data

US 2023/0286166 A1 Sep. 14, 2023

Related U.S. Application Data

(63) Continuation of application No.
PCT/KR2022/008768, filed on Jun. 21, 2022.

(30) Foreign Application Priority Data

Aug. 25, 2021 (KR) ........................ 10-2021-0112501

(51) Int. Cl.
B25J 9/16 (2006.01)
(52) U.S. Cl.
CPC ............. B25J 9/1697 (2013.01); B25J 9/161
(2013.01); B25J 9/1653 (2013.01)
(58) Field of Classification Search
CPC ........ B25J 9/1697; B25J 9/161; B25J 9/1653;
B25J 9/16; B25J 11/00; B25J 11/0005;
(Continued)

(56) References Cited

U.S. PATENT DOCUMENTS

| 6,721,444 B1 | 4/2004 | Gu et al. |
| 7,769,203 B2 | 8/2010 | Oohashi et al. |

(Continued)

FOREIGN PATENT DOCUMENTS

| JP | 3525896 B2 | 5/2004 |
| JP | 2006-192563 A | 7/2006 |

(Continued)

OTHER PUBLICATIONS

Chek et al. "Combination of Active Sensing and Sensor Fusion for
Collision Avoidance in Mobile Robots" 1997, Lecture Notes in
Computer Science, vol. 1311 (Year: 1997).*

(Continued)

*Primary Examiner* — Jason Holloway
*Assistant Examiner* — Elizabeth Rose Neleski
(74) *Attorney, Agent, or Firm* — Jefferson IP Law, LLP

(57) ABSTRACT

A robot is provided. The robot includes an image sensor, a
driving part, a memory configured to store at least one
instruction, and a processor, and the processor is configured
to obtain a first image captured by the image sensor, obtain
first information on an object included in the first image,
control the driving part for the robot to approach the object,
obtain a second image while the robot is approaching the
object, obtain second information on an object based on the
second image, determine whether an error is present in first
information or second information based on the first infor-
mation and the second information, and control an operation
of the robot based on a determination result.

15 Claims, 11 Drawing Sheets

(58) Field of Classification Search
CPC ............... B25J 9/1684; G05D 2101/20; G05D 2101/22; G05D 2105/31; G05D 2107/40; G05D 2109/10; G05D 2111/10; G05D 1/243; G05D 1/689; G05D 1/0246; G06V 10/62; G06V 10/82; G06V 10/98; G06V 20/10; G06V 40/103; G06T 7/001; G06T 7/70

See application file for complete search history.

(56) References Cited

U.S. PATENT DOCUMENTS

| | | | |
|---|---|---|---|
| 9,305,217 | B2 | 4/2016 | Lee et al. |
| 11,113,532 | B2 | 9/2021 | Kim et al. |
| 11,294,383 | B2 | 4/2022 | Yang et al. |
| 11,321,564 | B2 | 5/2022 | Choi et al. |
| 11,688,081 | B2 | 6/2023 | Yang et al. |
| 2008/0240505 | A1* | 10/2008 | Nakamura ......... G01C 21/3815 |
| | | | 382/104 |
| 2017/0091532 | A1 | 3/2017 | Son et al. |
| 2018/0272537 | A1 | 9/2018 | Ishigaki et al. |
| 2019/0389057 | A1 | 12/2019 | Chae et al. |
| 2020/0013190 | A1* | 1/2020 | Li ......................... G06V 10/82 |
| 2020/0042796 | A1 | 2/2020 | Kim et al. |
| 2020/0053324 | A1 | 2/2020 | Deyle et al. |
| 2021/0073570 | A1 | 3/2021 | Yang et al. |
| 2021/0200189 | A1 | 7/2021 | Yoo et al. |
| 2021/0271923 | A1* | 9/2021 | Yu ......................... G06N 3/045 |

FOREIGN PATENT DOCUMENTS

| | | | |
|---|---|---|---|
| KR | 10-0866380 | B1 | 11/2008 |
| KR | 10-2017-0038378 | A | 4/2017 |
| KR | 10-1972095 | B1 | 4/2019 |
| KR | 10-2019-0094133 | A | 8/2019 |
| KR | 10-2019-0104488 | A | 9/2019 |
| KR | 10-2026338 | B1 | 9/2019 |
| KR | 10-2020-0094451 | A | 8/2020 |
| KR | 10-2020-0134579 | A | 12/2020 |
| KR | 10-2021-0029586 | A | 3/2021 |
| KR | 10-2021-0085696 | A | 7/2021 |
| KR | 10-2021-0086129 | A | 7/2021 |
| WO | 2019/187816 | A1 | 10/2019 |

OTHER PUBLICATIONS

Extended European Search Report dated Feb. 9, 2024, issued in European Patent Application No. 22861526.6.
Terence Check et al., Combination of Active Sensing and Sensor Fusion for Collision Avoidance in Mobile Robots, Jan. 30, 1997.
Becerra Israel et al., Reliable confirmation of an object identity by a mobile robot: A mixed appearance/ localization-driven motion approach, Jul. 11, 2016.
Gluhakovic Mario et al., Vehicle Detection in the Autonomous Vehicle Environment for Potential Collision Warning, May 26, 2020.
European Office Action dated Jul. 30, 2024, issued in European Patent Application No. 22 861 526.6-1201.
International Search Report dated Oct. 6, 2022, issued in International Patent Application No. PCT/KR2022/008768.
European Search Report dated Jun. 17, 2025, issued in European Application No. 25180163.5.
European Office Action dated Oct. 30, 2025, issued in European Application No. 25180163.5.
European Search Office dated Feb. 27, 2026, issued in European Application No. 25 180 163.5.
Korean Office Action dated Mar. 24, 2026, issued in Korean Application No. 10-2021-0112501.

* cited by examiner

FIG. 8A

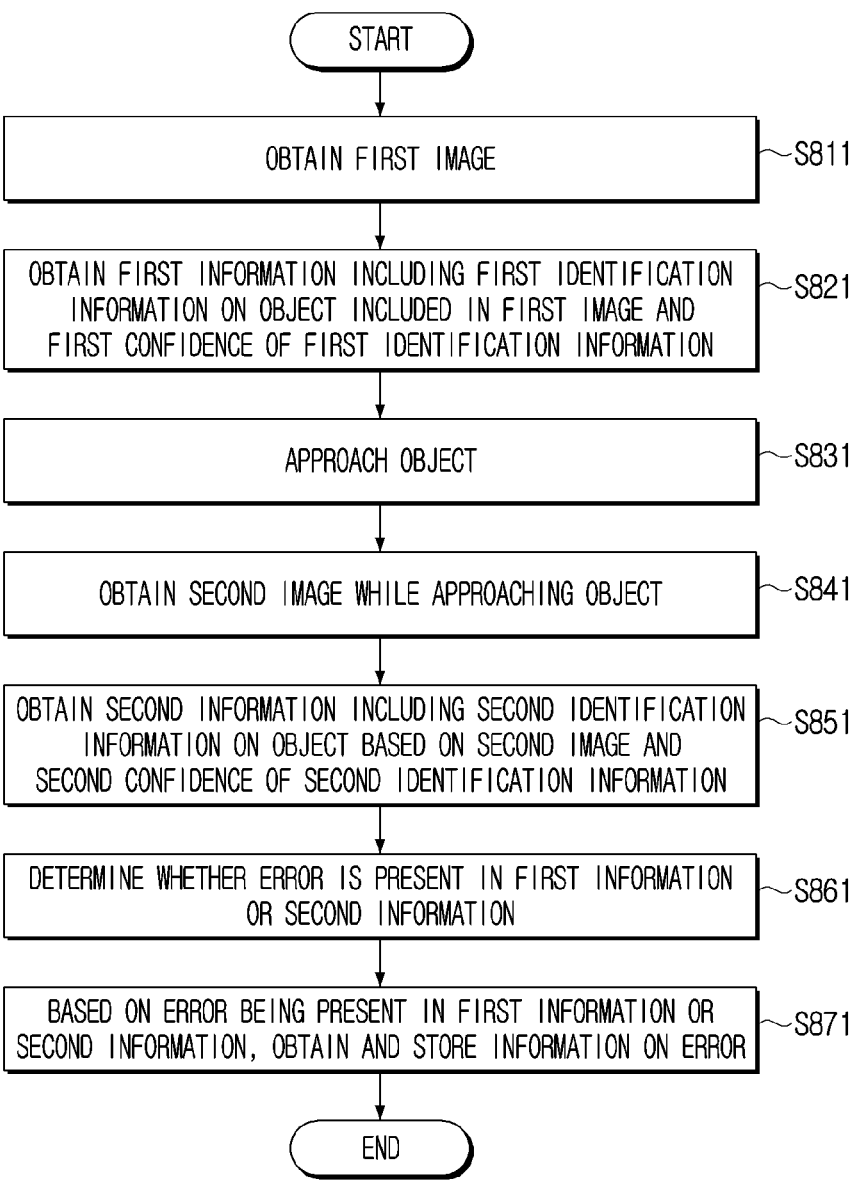

START

OBTAIN FIRST IMAGE ~S811

OBTAIN FIRST INFORMATION INCLUDING FIRST IDENTIFICATION INFORMATION ON OBJECT INCLUDED IN FIRST IMAGE AND FIRST CONFIDENCE OF FIRST IDENTIFICATION INFORMATION ~S821

APPROACH OBJECT ~S831

OBTAIN SECOND IMAGE WHILE APPROACHING OBJECT ~S841

OBTAIN SECOND INFORMATION INCLUDING SECOND IDENTIFICATION INFORMATION ON OBJECT BASED ON SECOND IMAGE AND SECOND CONFIDENCE OF SECOND IDENTIFICATION INFORMATION ~S851

DETERMINE WHETHER ERROR IS PRESENT IN FIRST INFORMATION OR SECOND INFORMATION ~S861

BASED ON ERROR BEING PRESENT IN FIRST INFORMATION OR SECOND INFORMATION, OBTAIN AND STORE INFORMATION ON ERROR ~S871

END

ROBOT AND METHOD FOR CONTROLLING THEREOF

CROSS-REFERENCE TO RELATED APPLICATION(S)

This application is a continuation application, claiming priority under § 365 (c), of an International application No. PCT/KR2022/008768, filed on Jun. 21, 2022, which is based on and claims the benefit of a Korean patent application number 10-2021-0112501, filed on Aug. 25, 2021, in the Korean Intellectual Property Office, the disclosure of which is incorporated by reference herein in its entirety.

BACKGROUND

1. Field

The disclosure relates to a robot and a method for controlling thereof. More particularly, the disclosure relates to a robot configured to determine whether an object is misrecognized and a method for controlling thereof.

2. Description of Related Art

Robots capable of interacting with a user are actively being used with the development of robot technologies. For example, the robot may provide a variety of services through interactions such as responding to a user question, serving food in a restaurant, guiding routes, or the like.

The above information is presented as background information only to assist with an understanding of the disclosure. No determination has been made, and no assertion is made, as to whether any of the above might be applicable as prior art with regard to the disclosure.

SUMMARY

For a smooth interaction with the user, a technology for accurately recognizing objects may be necessary. Otherwise, the robot may perform unnecessary operations and utility of the robot may decrease. For example, the robot may erroneously approach an unwanted object by misrecognizing the object or recognize an animal as a human or a figure of a human reflected in a mirror as an actual human.

Accordingly, there is a growing need for technology which prevents object misrecognition by the robot.

Aspects of the disclosure are to address at least the above-mentioned problems and/or disadvantages and to provide at least the advantages described below. Accordingly, an aspect of the disclosure is to provide a robot configured to determine whether there is object misrecognition, and operate based on a determination result.

The technical problems to be solved of the disclosure are not limited to the above-described technical problems, and the other technical problems not mentioned may be clearly understood by those of ordinary skill in the art from the description below.

Additional aspects will be set forth in part in the description which follows and, in part, will be apparent from the description, or may be learned by practice of the presented embodiments.

In accordance with an aspect of the disclosure, a robot is provided. The robot includes an image sensor, a driving part, a memory configured to store at least one instruction, and a processor, and the processor is configured to obtain a first image captured by the image sensor, input the first image to an object recognition model and obtain first information including first identification information on an object included in the first image and a first reliability of the first identification information, control the driving part for the robot to approach the object, obtain a second image captured by the image sensor while the robot is approaching the object, input the second image to the object recognition model and obtain second information including second identification information on an object and a second reliability of the second identification information, determine whether an error is present in the first information by comparing the first information and the second information, and control an operation of the robot based on the determination result.

The processor may be configured to determine, based on the first reliability being greater than the second reliability, that an error is present in the first information.

The processor may be configured to determine, based on the first identification information and the second identification information being different, that an error is present in the first information.

The processor may be configured to store, based on determining that an error is present in the first information, information on the error in the memory, and the information on the error may include the first image, and first position information and first direction information of the robot at a first time point at which the first image is captured.

The processor may be configured to obtain a third image captured by the image sensor, input the third image to the object recognition model and obtain third information including third identification information on an object included in the third image and a third reliability of the third identification information, and control an operation of the robot based on the third information and the information on the error.

The processor may be configured to control, based on the third reliability being greater than a pre-set value, the driving part to move toward the object included in the third image.

The processor may be configured to obtain third position information and third direction information of the robot at a third time point at which the third image is captured, and determine whether a location at which the first image is captured corresponds to a location at which the third image is captured based on the first position information, the first direction information, the third position information, and the third direction information.

The processor may be configured to determine, based on a difference of the first position information and the third position information being within a threshold value, a similarity of the first image and the third image, and increase, based on the similarity being greater than a threshold value, the pre-set value.

The processor may be configured to input the first image and the third image to a similarity obtaining model NN2 and determine a similarity of the first image and the third image.

In accordance with another aspect of the disclosure, a method for controlling a robot comprising an image sensor is provided. The method includes obtaining a first image captured by the image sensor, inputting the first image to an object recognition model and obtaining first information including first identification information on an object included in the first image and a first reliability of the first identification information, controlling the robot to approach the object, obtaining a second image captured by the image sensor while the robot approaches the object, inputting the second image to the object recognition model and obtaining second information including second identification information on the object and a second reliability of the second identification information, determining whether an error is present in the first information by comparing the first information and the second information, and controlling an operation of the robot based on the determination result.

The determining may include determining, based on the first reliability being greater than the second reliability, that an error is present in the first information.

The determining may include determining, based on the first identification information and the second identification information being different, that an error is present in the first information.

The control method may further include storing, based on determining that an error is present in the first information, information on the error in the memory, and the information on the error may include the first image, and first position information and first direction information of the robot at a first time point at which the first image is captured.

The control method may further include obtaining a third image captured by the image sensor, inputting the third image to the object recognition model and obtaining third information including third identification information on an object included in the third image and a third reliability of the third identification information, and controlling an operation of the robot based on the third information and the information on the error.

The control method may further include controlling, based on the third reliability being greater than a pre-set value, the robot to move toward an object included in the third image.

The control method may further include obtaining third position information and third direction information of the robot at a third time point at which the third image is captured, and determining whether a location at which the first image is captured corresponds to a location at which the third image is captured based on the first position information, the first direction information, the third position information, and the third direction information.

The control method may further include determining, based on determining that a location at which the first image is captured corresponds to a location at which the third image is captured, a similarity of the first image and the third image, and increasing, based on the similarity being greater than a threshold value, the pre-set value.

The determining of a similarity of the first image and the third image may include inputting the first image and the third image to a similarity obtaining model and determining a similarity of the first image and the third image.

The technical solution of the disclosure is not limited to the above-described solutions, and the technical solutions may be clearly understood by those of ordinary skill in the art to which the disclosure pertains based on the disclosure and accompanied drawings, unless otherwise specified.

According to the various embodiments of the disclosure as described above, object mis-recognition by the robot may be prevented. Accordingly, accuracy in recognition of an object may increase.

The effect which may be obtained or predicted by the embodiments of the disclosure other than what has been described above, will be directly disclosed or implied in the detailed description in the embodiments of the disclosure. For example, the various effects which may be predicted according to an embodiment of the disclosure will be described in the detailed description below.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which:

FIG. 8A is a flowchart illustrating a control method of a robot according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in describing one or more embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and this case, the meaning of the term will be disclosed in greater detail in the corresponding description. Accordingly, the terms used herein are not to be understood simply as its designation but based on the meaning of the term and the overall context of the disclosure.

Terms such as "first," and "second" may be used in describing the various elements, but the elements are not to be limited by the terms. The terms may be used only to distinguish one element from another.

It is to be understood that the terms such as "comprise" or "include" are used herein to designate a presence of a characteristic, number, step, operation, element, component, or a combination thereof, and not to preclude a presence or a possibility of adding one or more of other features, numbers, steps, operations, elements, components or a combination thereof.

Figure 1:
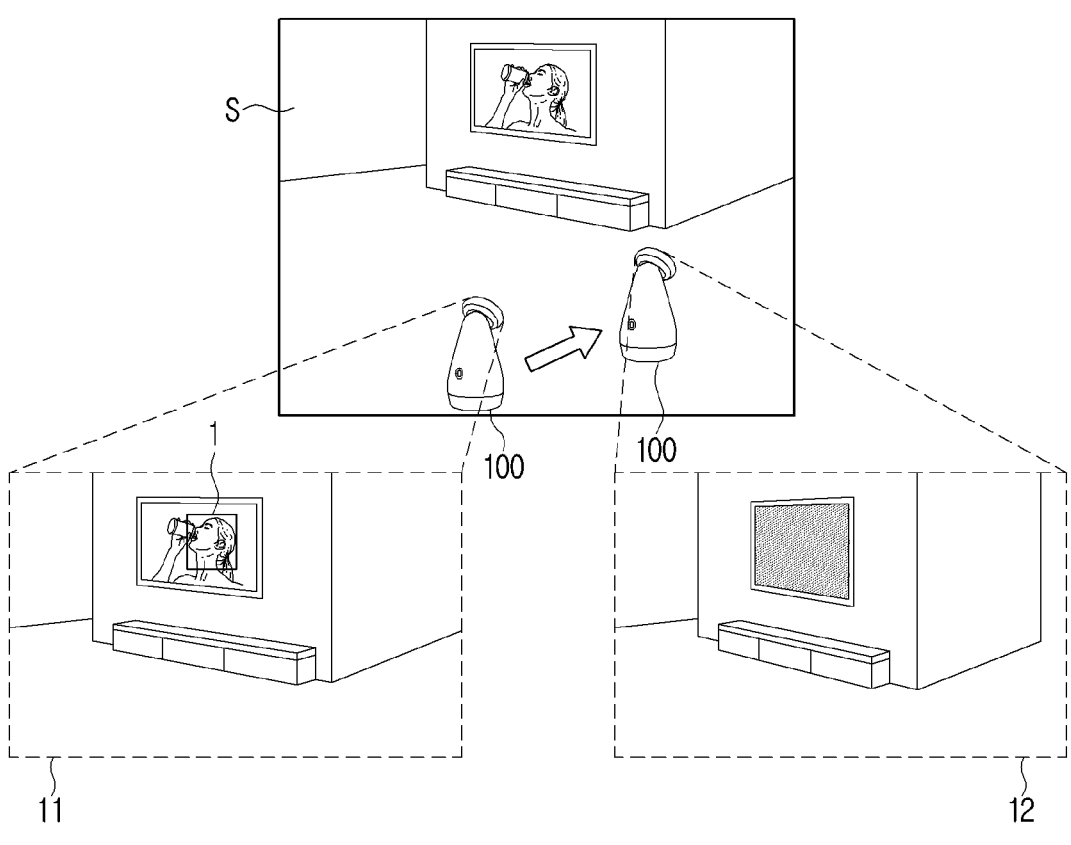
FIG. 1 is a diagram illustrating a concept of a robot according to an embodiment of the disclosure.

FIG. 1 is a diagram illustrating a concept of a robot according to an embodiment of the disclosure. As an example, a robot 100 may be a service robot. However, this is merely one embodiment, and the robot 100 may be realized as a robot (e.g., cleaning robot, etc.) of various types.

Referring to FIG. 1, the robot 100 may be configured to perform a task in a space S (e.g., television (TV) shop). For example, the robot 100 may be configured to sense a user while in movement in the space S. The robot 100 may be configured to perform an interaction with the sensed user and provide a service (e.g., product guidance).

The robot 100 may be configured to obtain an image which captured the surroundings of the robot 100 to sense the user, and sense the user by analyzing the image. Even if the robot 100 analyzes a plurality of images which captured a same object, pixel values corresponding to the object included in the respective images may be different based on various factors (e.g., angle capturing the image, distance between an image sensor and the object, whether an outside light is present, etc.). Accordingly, an object recognition result corresponding to the respective images may be different.

For example, the robot 100 may be configured to obtain a first image 11, and recognize an object 1 included in the first image 11. The robot 100 may be configured to move to perform an interaction with the object 1. The robot 100 may be configured to obtain a second image 12, while moving toward the object 1. That is, the second image is captured when the robot 100 is positioned more closely to the object than the position at which the first image is captured while the robot is approaching the object.

If the second image does not include the object 1, the object recognition results of the first and second images may be different from each other.

In a situation as described above, the robot 100 may be configured to determine that the analysis result on the first image includes an error based on the first image 11 and the second image 12. That is, the robot 100 may be configured to determine that the object 1 has been misrecognized the object 1. At this time, the robot 100 may be configured to store information on the error. As an example, the information on the error may include the first image 11, and position information of the robot 100 from a time point at which the first image 11 is captured.

Based on the robot 100 being positioned in the space S thereafter, the robot 100 may be configured to identify a currently positioned location as a location at which an error has occurred in the past. Further, the robot 100 may be configured to increase a pre-set value for determining an operation to be performed, and perform the operation based on the changed pre-set value. The pre-set value may be a reference value for deciding whether to perform an operation associated with the identified object, and a likelihood of the robot 100 performing the operation associated with the identified object may decline as the pre-set value increases. Accordingly, the robot 100 may be configured to prevent a malfunction by object misrecognition.

Figure 2:
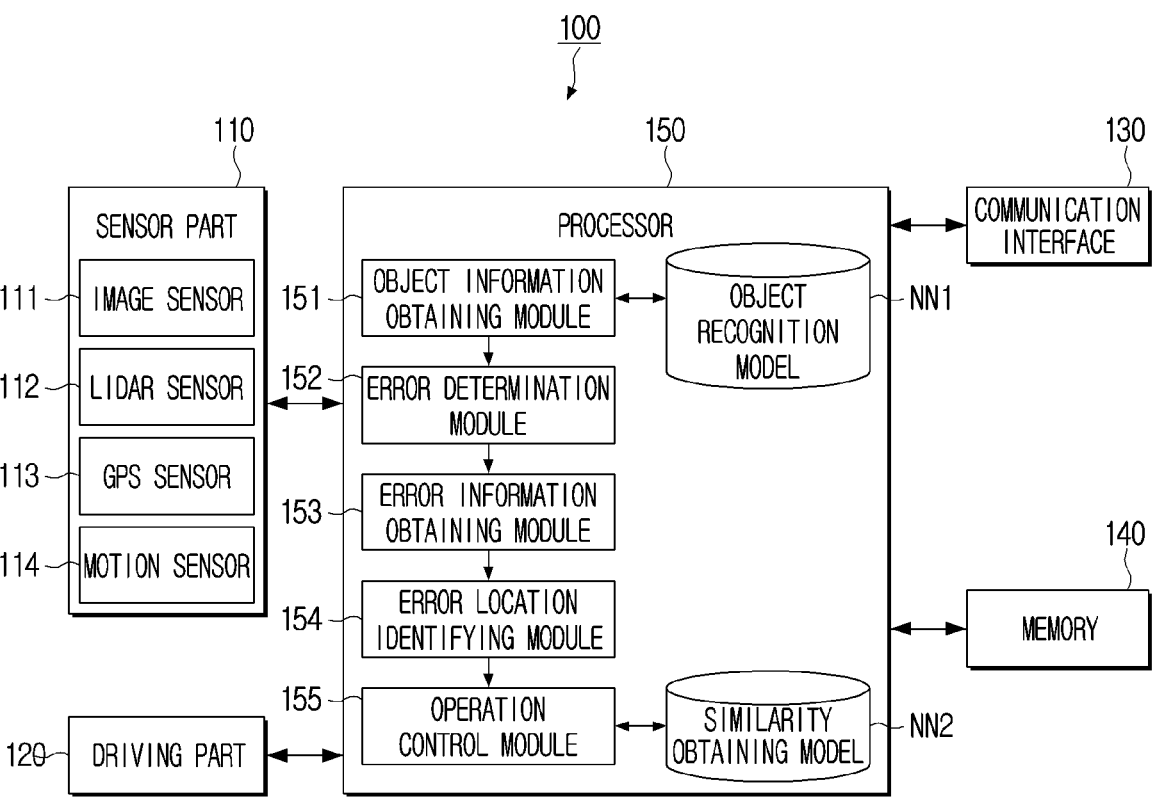
FIG. 2 is a block diagram illustrating a configuration of a robot according to an embodiment of the disclosure.

FIG. 2 is a block diagram illustrating a configuration of a robot according to an embodiment of the disclosure.

Referring to FIG. 2, the robot 100 may include a sensor part 110, a driving part 120, a communication interface 130, a memory 140, and a processor 150. However, the embodiment is not limited thereto, and the robot 100 may further include a speaker for outputting a guide voice, and a display for displaying a guide message. In an example, the robot 100 may be a service robot, but is not limited thereto, and may be a robot of various types such as, for example, and without limitation, an industrial use robot, a military robot, and the like. Respective configurations will be described below.

The sensor part 110 may include an image sensor 111, a light detection and ranging (LIDAR) sensor 112, a global positioning system (GPS) sensor 113, and a motion sensor 114. However, the embodiment is not limited thereto, and the sensor part 110 may further include various sensors such as a depth sensor and an ultrasonic sensor.

The image sensor 111 (or camera) may be a configuration for obtaining an image which captured the surroundings of the robot 100. The processor 150 may be configured to obtain an image captured based on a sensing value of the image sensor 111. The image sensor 111 may be configured to capture the surroundings of the robot 100 at a pre-set interval. As an example, the image sensor 111 may be disposed to capture a front view of the robot 100. The image sensor 111 may include a complementary metal oxide semiconductor (CMOS) sensor and a charge coupled device (CCD) sensor.

The LIDAR sensor 112 may be configured to obtain scan data including position information on an object present in the surrounding of the robot 100. As an example, the processor 150 may be configured to obtain, based on scan data obtained through the LIDAR sensor 112, position information on an object in the surroundings of the robot 100. The position information on an object may include distance information and angle information between the robot 100 and the object. As an example, the LIDAR sensor 112 may be configured to perform a scan at a pre-set angle (e.g., 360 degrees) based on the robot 100. To this end, the LIDAR sensor 112 may be configured to output a laser beam in the form of a point light source at a pre-set angle. Alternatively, the LIDAR sensor 112 may be configured to output a laser beam in the form of a line beam.

The GPS sensor 113 may be a sensor for receiving a global positioning system (GPS) signal. The GPS sensor 113 may be configured to obtain current position information x, y and z of the robot 100 based on the GPS signal.

The motion sensor 114 may be configured to obtain motion information of the robot 100. As an example, the motion sensor 114 may include an inertial measurement unit (IMU) sensor. The processor 150 may be configured to obtain orientation information of the robot 100 based on a sensing value of the motion sensor 114. The orientation information of the robot 100 may include information on a rotation direction and a rotation angle of the robot 100, and a facing direction of the robot 100. The facing direction may refer to a direction indicated by a driving path of the robot or a direction in which the camera of the robot photographs.

The driving part 120 may include a wheel configured to move the robot 100 and a wheel driving motor configured to rotate the wheel. In addition, the driving part 120 may further include a motor driving circuit configured to supply a driving current to the wheel driving motor, a power transfer module configured to transfer a torque of the wheel driving motor to the wheel, and a rotation sensing sensor configured to sense the wheel driving motor or a rotational displacement and a rotational speed of the wheel.

The communication interface 130 may include at least one circuitry and may be configured to perform communication with external devices of various types according to communication methods of various types. For example, the communication interface 130 may be configured to transmit a captured image obtained through the image sensor (i.e., sensor part 110) to an external server. Further, the communication interface 130 may be configured to receive information on the object included in the image captured from an external server. The communication interface 130 may include at least one from among a Wi-Fi module, a Bluetooth module, a ZigBee module, a Beacon module, a cellular communication module, a 3rd generation (3G) mobile communication module, a 4th generation (4G) mobile communication module, a 4th generation (4G) long term evolution (LTE) communication module, and a 5th generation (5G) mobile communication module.

The memory 140 may be configured to store an operating system (OS) for controlling the overall operation of the elements of the robot 100 and instructions or data associated with the elements of the robot 100. As an example, the memory 140 may be configured to store map information of a space in which the robot 100 is positioned. In addition, the memory 140 may store data necessary for a module for controlling an operation of the robot 100 to perform various operations. The module for controlling an operation of the robot 100 may include an object information obtaining module 151, an error determination module 152, an error information obtaining module 153, an error location identifying module 154, and an operation control module 155.

The memory 140 may be configured to store a trained neural network model. As an example, the memory 140 may include a first neural network model (e.g., an object recognition model NN1) and a second neural network model (e.g., a similarity obtaining model NN2). The memory 140 may be realized as a non-volatile memory (e.g., a hard disk, a solid state drive (SSD), a flash memory), a volatile memory, or the like. The neural network used in embodiments may be provided in various structures. The number of hidden layers included in the neural network, the number of nodes included in each layer, and/or the connection between nodes may vary depending on various embodiments.

The processor 150 may be electrically connected with the memory 140 and control the overall function and operation of the robot 100. The processor 150 may be configured to load, based on a user voice being input, data for modules 151 to 155 stored in the non-volatile memory to perform various operations in the volatile memory. The loading may refer to an operation of loading data stored in the non-volatile memory to the volatile memory and storing so as to be accessible by the processor 150.

The object information obtaining module 151 may be configured to obtain an image captured by the image sensor 111. As an example, the object information obtaining module 151 may be configured to obtain the first image and the second image. The first image may be an image captured when a distance between the image sensor 111 and the object is a first distance, and the second image may be an image captured when the distance between the image sensor 111 and the object is a second distance which is shorter than the first distance. At this time, the first image and the second image may include at least one common object. As an example, the first image and the second image may both include the first object.

The object information obtaining module 151 may be configured to obtain information on the object included in the obtained image. Here, the information on the object may include identification information on the object (e.g., human) and a reliability of the identification information. The reliability may indicate how accurate or how reliable the identification information shall be and have an indication value between 0 and 1. As the reliability increases, an accuracy of identification information may increase. The object information obtaining module 151 may be configured to input the captured image to the object recognition model NN1 and obtain information on the object. Here, the object recognition model NN1 may be a neural network model trained to obtain information on the object included in the input image, and may include a convolutional neural network (CNN).

As an example, the object information obtaining module 151 may be configured to input the first image to the object recognition model NN1 and obtain first information including first identification information on the first object included in the first image and a first reliability of the first identification information. In addition, the object information obtaining module 151 may be configured to input the second image to the object recognition model NN1 and obtain second information including second identification information on the first object included in both the first image and the second image and a second reliability of the second identification information including second identification information on the first object included in the first image and a first reliability of the first identification information.

The error determination module 152 may be configured to determine whether an error is present in the information on the object obtained through the object information obtaining module 151. The error determination module 152 may be configured to compare the plurality of images captured under different capturing conditions and determine whether an error is present in the information on the object. The capturing condition may be defined based on at least one from among the distance and angle between the image sensor 111 and the object. A method of determining whether an error is present in the information on the object based on the plurality of images captured when the distance between the image sensor 111 and the object is different will be described below.

As described above, the first image captured when the distance between the image sensor 111 and the object is the first distance and the second image when the distance between the image sensor 111 and the object is the second distance which is shorter than the first distance may be obtained. Further, the first image and the second image may both include the first object.

The error determination module 152 may be configured to determine whether an error is present in the first information based on the first information corresponding to the first image and the second information corresponding to the second image. In an example, the error determination module 152 may be configured to determine, that an error is present in the first information. For example, the first identification information on the first object may be a 'human,' and the second identification information on the first object may be a 'puppy.' Then, based on the first identification information and the second identification information being different, the error determination module 152 may be configured to give a higher priority to, the second identification information than that to the first identification information and determine that an error is present in the first identification information.

The first object may not be included in the second image. Accordingly, the second information on the second image may not include information on the first object. Accordingly, based on the object identified in the first image not being identified in the second image, the error determination module 152 may be configured to determine that an error is present in the first information. As an example, based on the object not being identified in an area of the second image corresponding to the first object, the error determination module 152 may be configured to determine that an error is present in the first information.

The error determination module 152 may be configured to determine, based on the first reliability being greater than the second reliability, that an error is present in the first information. As an example, the first identification information and the second identification information on the first object may correspond to 'human,' respectively, and the first reliability may be 0.7 and the second reliability may be 0.5. At this time, the error determination module 152 may be configured to determine that an error is present in the first information because the first reliability is greater than the second reliability.

The error determination module 152 may be configured to obtain information on the respective images captured at different angles, and determine whether an error is present in the obtained information. As an example, the first image captured when positioning the first object at an edge part of a viewing angle of the image sensor 111 and the second image captured when positioning the first object at a center of the viewing angle of the image sensor 111 may be obtained. Based on the first identification information on the first object included in the first image and the second identification information on the first object included in the second image being different, the error determination module 152 may be configured to determine that there is an error present in the first identification information or the second identification information.

The error information obtaining module 153 may be configured to obtain information on the error and store in the memory 140. The information on the error may include an image capturing an error location, and position information and direction information of the robot 100 when capturing the image. As an example, the error information obtaining module 153 may be configured to store the first image, first position information and first direction information of the robot 100 at a first time point at which the first image is captured in the memory 140. The position information per the respective times of the robot 100 may be stored in the memory 140. As an example, the position information of the robot 100 may be calculated based on a pre-stored map information and a sensing value of the LIDAR sensor 112.

Alternatively, the position information of the robot 100 may be obtained based on the GPS sensor 113.

The robot 100 according to the disclosure may be configured to determine whether an error is present in the information on the object, and operate at a first state in which error information is collected and stored and a second state in which an interaction with the user is performed. The above-described error determination module 152 and error information obtaining module 153 may be configured to operate when the robot 100 is in the first state. That is, the error determination module 152 and the error information obtaining module 153 may not operate when the robot 100 is in the second state.

The error location identifying module 154 may be configured to compare the current position information and direction information of the robot 100 with the information on the error stored in the memory 140, and identify whether the location currently positioned by the robot 100 is the location at which the error has occurred (hereinbelow, referred to as an error location). Based on the current position of the robot 100 being within a pre-set range from the location at which the error occurred, and a difference of a current angle faced by the robot 100 or the image sensor 111 and the stored angle being within a pre-set range, the error location identifying module 154 may be configured to determine that the robot 100 is currently positioned at the error location.

The operation control module 155 may be configured to control the various operations of the robot 100 based on the state of the robot 100. Based on an object being identified in the image obtained through the image sensor 111 while in the robot 100 is in the first state, the operation control module 155 may be configured to control the driving part 120 to approach toward the identified object. As an example, the operation control module 155 may be configured to control the driving part 120 to approach toward the first object which is included in the first image. The first image may be an image captured when the distance between the robot 100 and the first object is the first distance. The operation control module 155 may be configured to control the driving part 120 so that the distance between the first object and the robot 100 becomes shorter than the first distance. The image sensor 111 may be configured to capture the second image at the second distance in which the distance between the robot 100 and the first object is shorter than the first distance.

In addition, the operation control module 155 may be configured to control the driving part 120 so that the robot 100 is rotated within a range that the identified object does not exceed the viewing angle of the image sensor 111. As an example, based on first object being positioned at the center (that is, 0 degree) of the viewing angle of the image sensor 111, and the viewing angle of the image sensor 111 being between −60 degrees to +60 degrees, the operation control module 155 may be configured to control the driving part so that the robot 100 is rotated +5 degrees. Accordingly, the image sensor 111 may be configured to capture the same object from a plurality of angles.

Based on the robot 100 being in the second state, the operation control module 155 may be configured to control the operation of the robot 100 based on information on the object obtained through the object information obtaining module 151. Specifically, the operation control module 155 may be configured to control an operation of the robot 100 based on the reliability of the identification information on the object. Specifically, based on the reliability of the identification information on the object being greater than the pre-set value (e.g., 0.5), the operation control module 155 may be configured to control the robot 100 to perform an operation associated with the object. On the other hand, based on the reliability of the identification information on the object being smaller than the pre-set value, the operation control module 155 may be configured to determine the object as noise and not perform an operation control associated with the object. That is, the pre-set value may be a reference value for deciding whether to perform an operation associated with the identified object.

As an example, based on the object being a human and the reliability of the identification information on the object being greater than the pre-set value, the operation control module 155 may be configured to control the speaker to output an audio guide by approaching toward the object, or control the display to output a video guide. On the other hand, based on the reliability of the identification information on the object being smaller than the pre-set value, the operation control module 155 may not perform an operation control associated with the object, even if the object is a human.

The pre-set value may be changed according to the position of the robot 100. As an example, based on the robot 100 being positioned at the error location, the pre-set value may be increased. Based on the pre-set value increasing, the likelihood of robot 100 performing an operation associated with the identified object may decrease. That is, because an error is likely to be included in the information on the object in the error location, performing the operation (e.g., an operation of the robot approaching an object because the object, which is not a human, is misrecognized as the human) associated with the misrecognized object may be prevented when the pre-set value is increased.

When the robot 100 is positioned at the error location, the operation control module 155 may be configured to change the pre-set value based on the similarity between the image captured at the current position and the image stored in the memory 140 as error information. The operation control module 155 may be configured to determine the similarity of the first image stored in the memory 140 as error information with a third image captured at the current position. Based on the similarity being greater than a threshold value, the operation control module 155 may increase the pre-set value. On the other hand, based on the similarity being smaller than the threshold value, the operation control module 155 may not change the pre-set value.

As described above, the reason for changing the pre-set value based on the stored error information and the similarity of the current image is because changes to the environment may occur such as a previously present misrecognized object disappearing or a new object being included even if capturing is performed from the same position facing the same direction. For example, a new user not included in the first image may be positioned in the error occurring location. At this time, based on the pre-set value becoming greater than the reliability of the identification information on the new user because the pre-set value is increased, the robot 100 may not perform an operation (e.g., interaction) associated with the new user. Accordingly, this may result in the inconvenience of the new user.

The operation control module 155 may be configured to determine the similarity of the first image and the third image by using the similarity obtaining model NN2. The similarity obtaining model NN2 may be a neural network model trained to obtain the similarity between the plurality of input images, and may include the convolutional neural network (CNN). The operation control module 155 may be configured to input the first image and the third image to the similarity obtaining model NN2 and determine the similarity of the first image and the third image.

Referring to FIG. 2, the respective modules 151 to 155 have been described as configurations of the processor 150, but this is merely one embodiment, and the respective modules 151 to 155 may be stored in the memory 140. At this time, the processor 150 may be configured to load the plurality of modules 151 to 155 stored in the memory 140 from the non-volatile memory to the volatile memory and execute respective functions of the plurality of modules 151 to 155. In addition, the respective modules of the processor 150 may be realized using a software, or realized in a form in which a software and a hardware are combined.

The function associated with an artificial intelligence according to the disclosure may be operated through the processor 150 and the memory 140. The processor 150 may be comprised of one or a plurality of processors. The one or plurality of processors may be a generic-purpose processor such as a central processing unit (CPU), an application processor (AP), or a digital signal processor (DSP), a graphics dedicated processor such as a graphic processing unit (GPU) or a vision processing unit (VPU), or an artificial intelligence dedicated processor such as a neural processing unit (NPU). The one or plurality of processors may be configured to control for the input data to be processed according to a pre-defined operation rule or an artificial intelligence model stored in the memory 140. Alternatively, if the one or plurality of processors is an artificial intelligence dedicated processor, the artificial intelligence dedicated processor may be designed to a hardware structure specializing in the processing of a specific artificial intelligence model.

The pre-defined operation rule or the artificial intelligence model is characterized by being created through learning. The fact that the pre-defined operation rule or the artificial intelligence model is created through learning means that the pre-defined operation rule or artificial intelligence model is created to perform a desired feature (or, purpose) as the basic artificial intelligence module is trained by a learning algorithm using a plurality of learning data. The learning may be carried out in the machine itself in which the artificial intelligence according to the disclosure is performed, or carried out through a separate server and/or system. Examples of the learning algorithm may include a supervised learning, an unsupervised learning, a semi-supervised learning, or a reinforcement learning, but is not limited to the above-described examples.

The artificial intelligence model may be created through learning. The artificial intelligence model may be comprised of a plurality of neural network layers. The respective neural network layers may include a plurality of weight values, and may perform neural network processing through processing between the processing results of a previous layer and the plurality of weight values. The plurality of weight values comprised by the plurality of neural network layers may be optimized by the learning result of the artificial intelligence model. For example, the plurality of weight values may be updated for a loss value or a cost value obtained by the artificial intelligence model during the learning process to be reduced or minimized.

The artificial intelligence model may be processed by the artificial intelligence dedicated processor designed in a hardware structure specializing in the processing of the artificial intelligence model.

The artificial neural network may include a Deep Neural Network (DNN), and examples thereof may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep-Q Networks, or the like, but the embodiment is not limited to the above-described examples.

Figure 3:
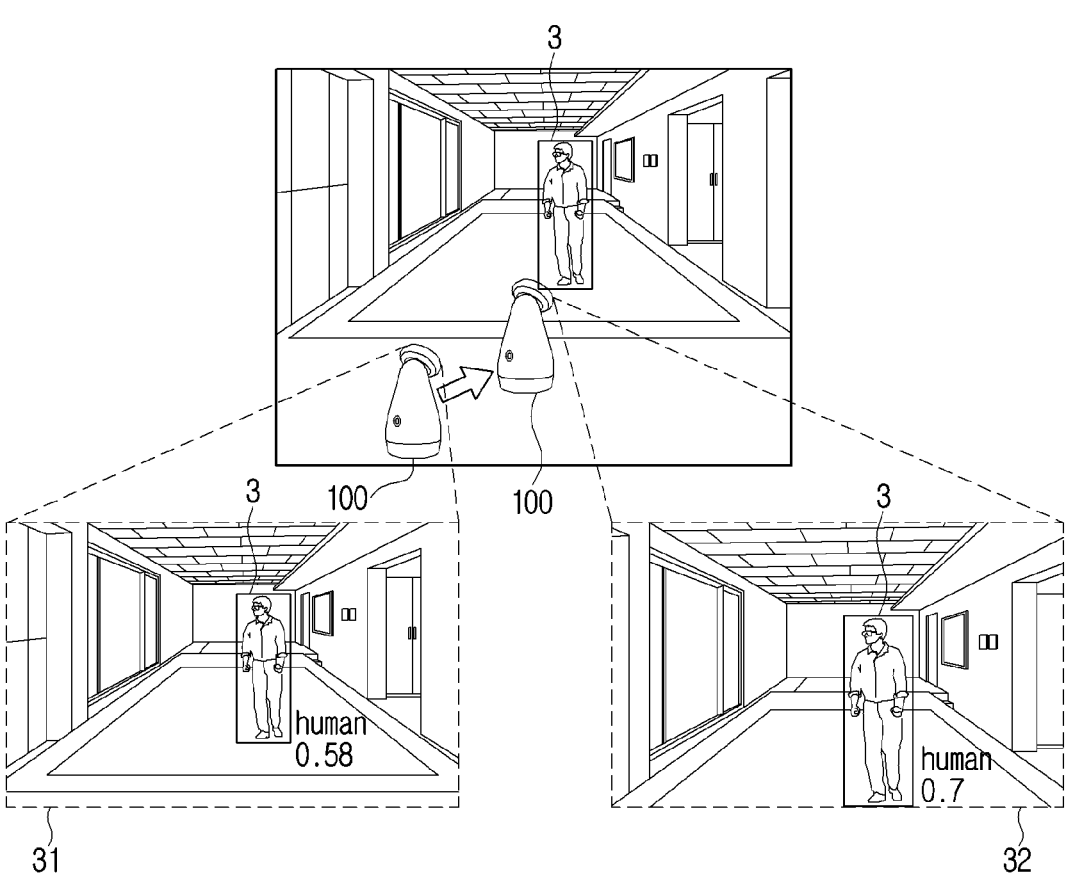
FIG. 3 is a diagram illustrating an error determination method according to an embodiment of the disclosure.

FIG. 3 is a diagram illustrating an error determination method according to an embodiment of the disclosure.

Referring to FIG. 3, a case in which the object misrecognition has not occurred is illustrated. The robot 100 may be configured to obtain a first image 31 which captured a first object 3 when the distance between the robot 100 and the first object 3 is the first distance. The robot 100 may be configured to perform, based on the first image 31, an object recognition operation to obtain the first information on the first object 3. For example, the first information on the first object 3 may include the first identification information (human) and the first reliability (0.58) of the first identification information.

The robot 100 may approach the first object 3 and obtain the second image 32 which captured the first object 3 when the distance between the robot 100 and the first object 3 is the second distance which is shorter than the first distance. The robot 100 may be configured perform the object recognition operation based on the second image 32 and obtain information on the first object 3. For example, the second information on the first object 3 may include the second identification information (human) and the second reliability (0.7) of the second identification information.

The robot 100 may be configured to determine whether there is an error present in the first information based on the first information and the second information. Specifically, the robot 100 may be configured to determine whether the first identification information and the second identification information are a match, and whether the second reliability is greater than the first reliability. Based on the first identification information and the second identification information being a match and the second reliability being greater than the first reliability, the robot 100 may be configured to determine that an error is not present in the first information. That is, the robot 100 may be configured to determine as not having misrecognized the first object 3. On the other hand, based on the first identification information and the second identification information not being a match and the second reliability being smaller than the first reliability, the robot 100 may be configured to determine that an error is not present in the first information. In FIG. 3, because the first identification information (human) and the second identification information (human) are a match, and the second reliability (0.7) is greater than the first reliability (0.58), the robot 100 may be configured to determine that an error is not present in the first information.

Figure 4:
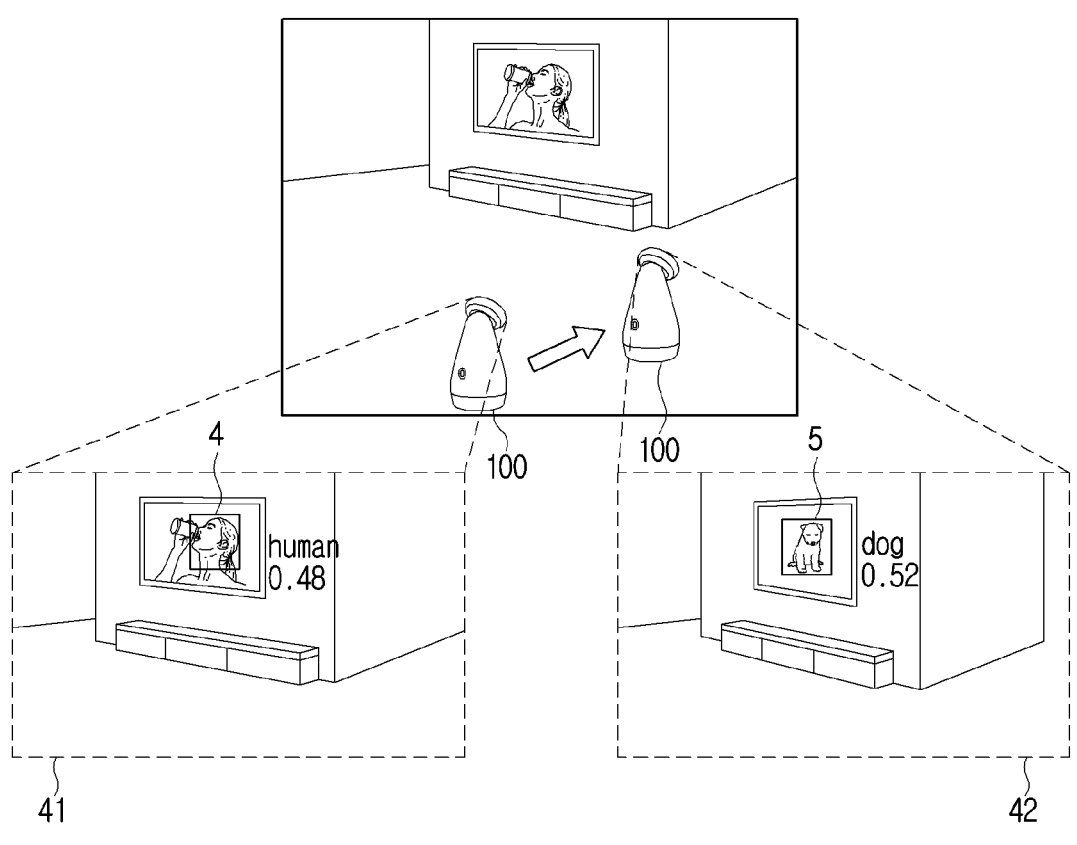
FIG. 4 is a diagram illustrating an error determination method according to an embodiment of the disclosure.

FIG. 4 is a diagram illustrating an error determination method according to an embodiment of the disclosure.

Referring to FIG. 4, a case in which object misrecognition has occurred is illustrated. The robot 100 may be configured to obtain a first image 41 which captured a first object 4 when the distance between the robot 100 and the first object 4 is the first distance. The first object 4 may not be an actual object, but an object included in an image output from a display device. The robot 100 may be configured to perform, based on the first image 41, the object recognition operation to obtain the first information on the first object 4. For example, the first information on the first object 4 may include the first identification information (human) and the first reliability (0.48) of the first identification information.

The robot 100 may be configured to obtain the second image 42 while in movement to approach the first object 4. Meanwhile, the image output from the display device may change while the robot 100 is in movement, and a second object 5 and not the first object 4 may be included in the second image 42. The robot 100 may be configured to obtain information on a second object 5 by performing the object recognition operation based on the second image 42. For example, the second information on the second object 5 may include the second identification information (dog) and the second reliability (0.52) of the second identification information.

Referring to FIG. 4, based on the first identification information (human) and the second identification information (dog) not matching, the robot 100 may be configured to determine that there is an error present in the first information or the second information. That is, the robot 100 may be configured to determine as having misrecognized the first object 4.

Figure 5:
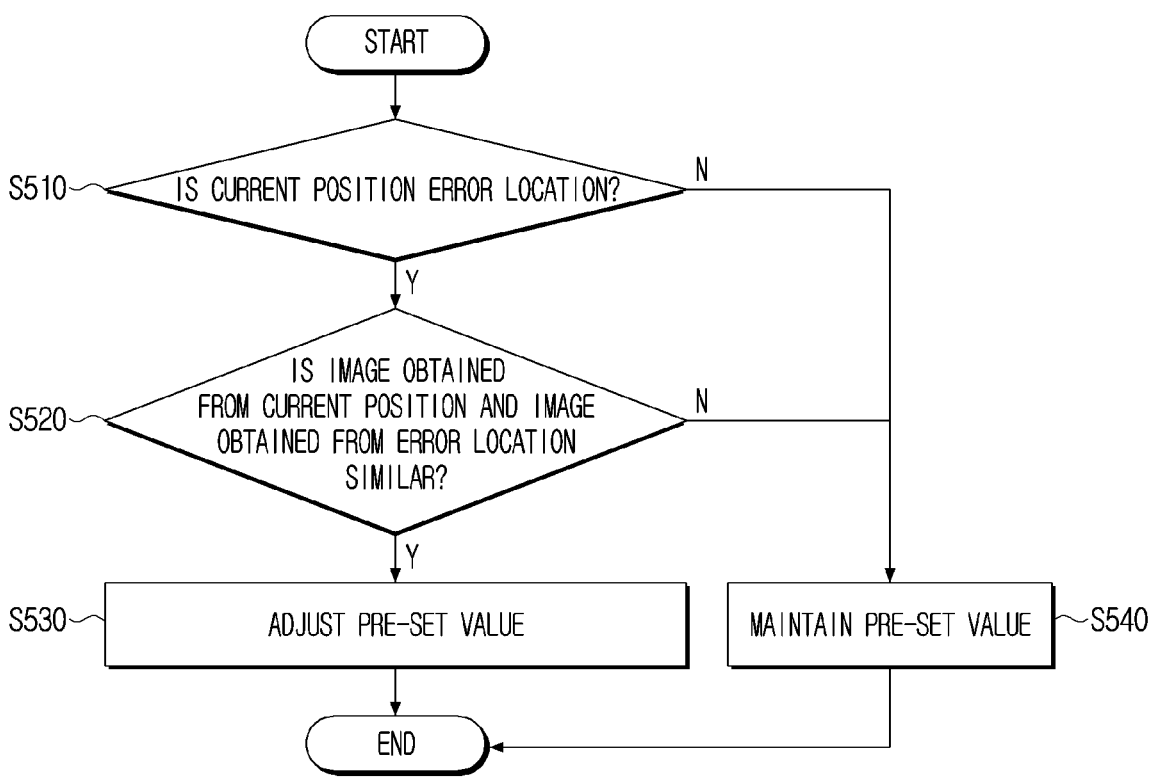
FIG. 5 is a flowchart illustrating an example of controlling a pre-set value according to an embodiment of the disclosure.

FIG. 5 is a flowchart illustrating an example of controlling a pre-set value according to an embodiment of the disclosure.

Referring to FIG. 5, the robot 100 may be configured to determine whether the current position is the error location at operation S510.

Figure 6:
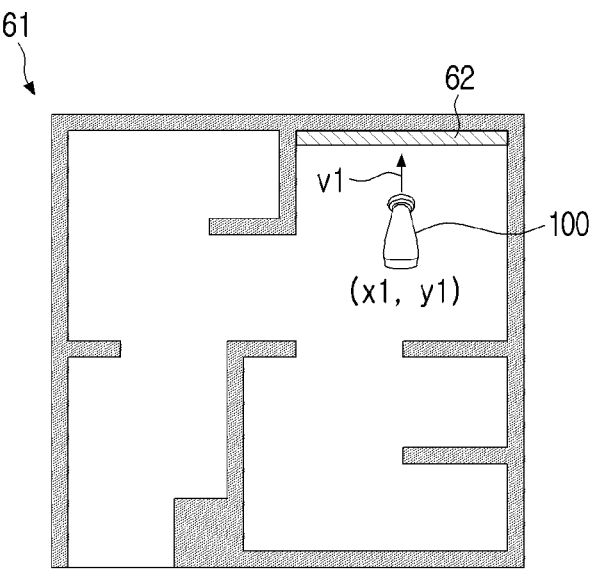
FIG. 6 is a diagram illustrating a method of determining an error location according to an embodiment of the disclosure.

FIG. 6 is a diagram illustrating a method of determining an error location according to an embodiment of the disclosure.

Referring to FIG. 6, the robot 100 may be configured to store map information 61 on a space in which the robot 100 is currently positioned. In addition, the robot 100 may be configured to store information (e.g., position information) on the location 62 (that is, error location) at which an error previously occurred. For example, the robot 100 may be configured to determine whether it is positioned at the error location 62 by comparing the information on the current position x1 and y1, a facing direction v1 with the stored error location. The error location 62 may include various environments such as a wall paper with a human silhouette or a mirror.

Based on the current position being determined as the error location, the robot 100 may be configured to further determine whether the image obtained from the current position is similar to the image obtained from the error location at operation S520. Specifically, the robot 100 may be configured to determine whether the similarity of the image obtained at the current position and the image obtained from the error location is greater than the threshold value. Based on the similarity being greater than the threshold value, the robot 100 may be configured to determine that the image obtained from the current position and the image obtained from the error location are similar. On the other hand, based on the similarity being smaller than the threshold value, the robot 100 may be configured to determine that the image obtained from the current position and the image obtained from the error location are not similar.

Figure 7:
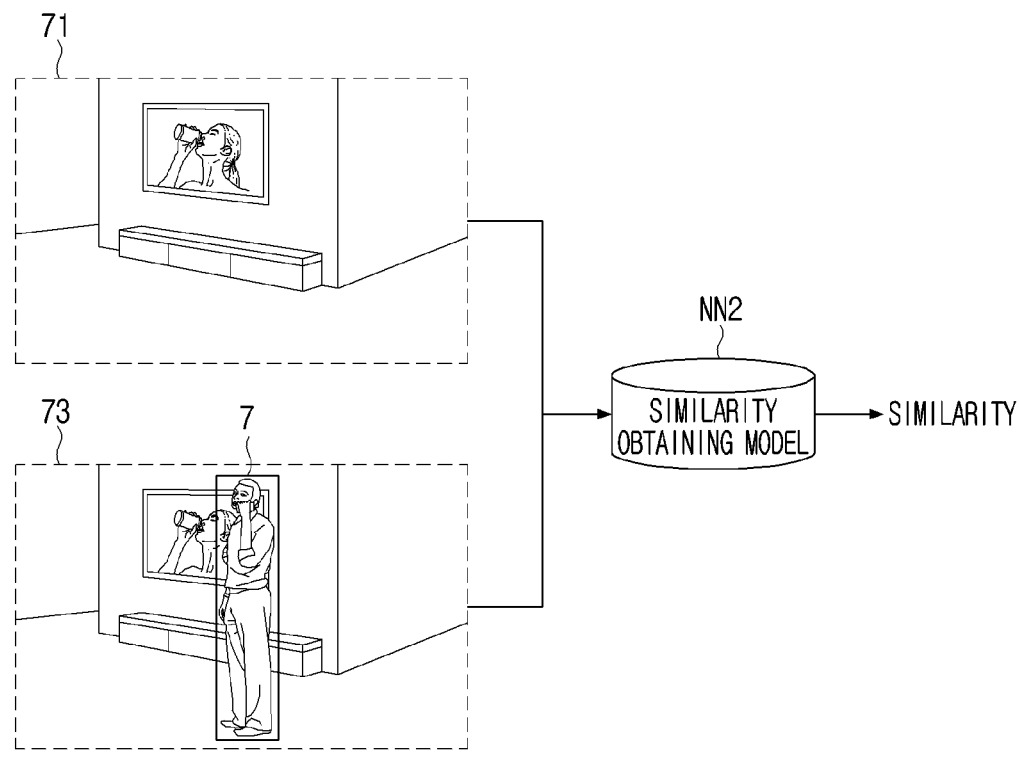
FIG. 7 is a diagram illustrating a method of determining similarity between images according to an embodiment of the disclosure.

FIG. 7 is a diagram illustrating a method of determining similarity between images according to an embodiment of the disclosure.

As an example, referring to FIG. 7, the robot 100 may be configured to input a first image 71 obtained from the error location and a third image 73 obtained from the current position to the similarity obtaining model NN2 and obtain the similarity of the first image 71 and the third image 73. The first image 71 may be information on the error location, and may be pre-stored in the robot 100.

Referring back to FIG. 5, based on the image obtained from the current position and the image obtained from the error location being determined as similar, the robot 100 may be configured to adjust the pre-set value at operation S530. Specifically, the robot 100 may be configured to increase the pre-set value. On the other hand, based on the image obtained from the current position and the image obtained from the error location being determined as not similar, the robot 100 may be configured to maintain the pre-set value at operation S540.

As described above, the likelihood of the robot 100 performing an operation associated with the identified object may decrease as the pre-set value is increased. For example, it may be assumed that the robot 100 obtained identification information ('human') on the object and the reliability ('0.65') of the identification information ('human'), and that the pre-set value is set as 0.6. At this time, because the obtained reliability ('0.65') is greater than the pre-set value, the robot 100 may be configured to perform the operation associated with the object. As an example, the robot 100 may be configured to approach the object and perform an inter-action with the object.

Based on the pre-set value increasing from 0.6 to 0.7, because the obtained reliability ('0.65') is smaller than the pre-set value, the robot 100 may not perform the operation associated with the object. That is, as the pre-set value is increased, there may be the effect of reducing the likelihood of the robot 100 malfunctioning by misrecognizing the object.

Based on the pre-set value being adjusted without considering the similarity of the image obtained from the current position and the image obtained from the error location, this may result in the inconvenience of the user. Referring to FIG. 7, a user 7 may be included in the third image 73 which is captured at the error location. If the pre-set value is increased without a similarity determination, the robot 100 may not perform the operation associated with the user 7, and there may be the problem of the user 7 not being provided with service. The robot 100 according to the disclosure may determine that the first image 71 and the third image 73 are not similar, and maintain the pre-set value. Accordingly, the robot 100 may be configured to perform an operation associated with the user 7, and the user 7 may be provided with service. That is, the problem of the user 7 not being provided with service may be prevented.

FIG. 8A is a flowchart illustrating a control method of a robot according to an embodiment of the disclosure. Specifically, FIG. 8A is a flowchart illustrating the control method of the robot when operating in a first mode of collecting error information.

Referring to FIG. 8A, the robot 100 may be configured to obtain the first image at operation S811, and obtain first information including first identification information on the object included in the first image and the first reliability of the first identification information at operation S821. The robot 100 may be configured to approach the object at operation S831, and obtain the second image while approaching the object at operation S841. The robot 100 may be configured to obtain second information including second identification information on the object based on the second image and the second reliability of the second identification information at operation S851.

The robot 100 may be configured to determine whether there is an error present in the first information or the second information at operation S861. As an example, based on the first reliability being greater than the second reliability, the robot 100 may be configured to determine that an error is present in the first information or the second information. Alternatively, based on the first identification information and the second identification information being different the robot 100 may be configured to determine that an error is present in the first information or the second information.

Based on an error being present in the first information or the second information, the robot 100 may be configured to obtain and store information on the error at operation S871. As an example, the information on the error may include the first image, and the first position information and the first direction information of the robot 100 from the first time point at which the first image was captured.

Figure 8B:
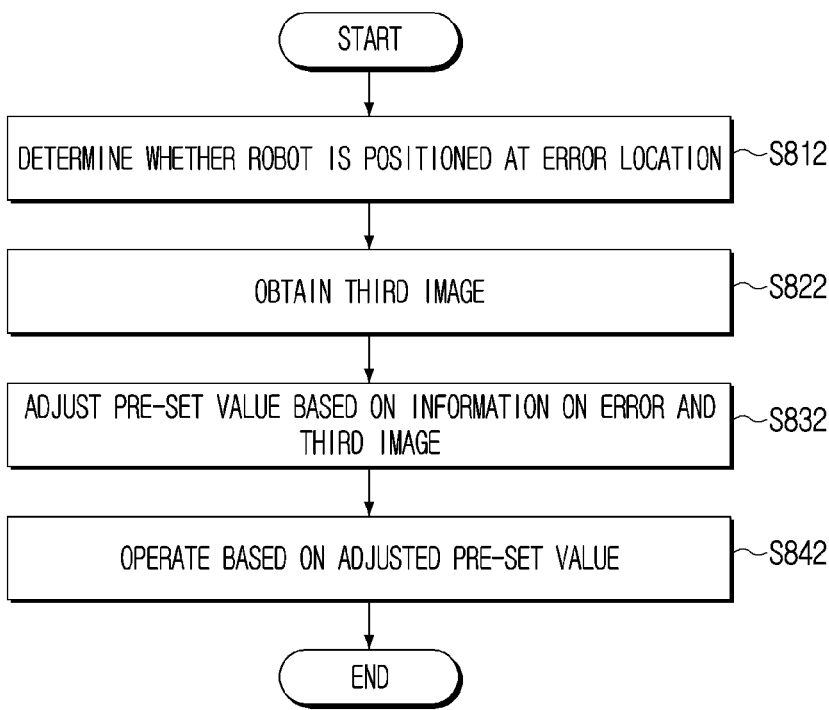
FIG. 8B is a flowchart illustrating a control method of a robot according to an embodiment of the disclosure.

FIG. 8B is a flowchart illustrating a control method of a robot according to an embodiment of the disclosure. Specifically, FIG. 8B is a flowchart illustrating the control method of the robot when operating in a second mode of performing an operation for providing service.

Referring to FIG. 8B, the robot 100 may be configured to perform an operation for sensing the user while travelling a pre-set area. The robot 100 may be configured to determine whether the robot 100 is positioned at the error location at operation S812. As an example, the robot 100 may be configured to determine whether the current position corresponds to the error location by comparing the stored information on the error and the current position information.

The robot 100 may be configured to obtain, based on the robot being determined to be positioned in the error location, the third image at operation S822, and to adjust the pre-set value based on the information on the error and the third image at operation S832. As an example, the robot 100 may be configured to determine the similarity of the first image captured at the error location and the third image. Based on the similarity being greater than the threshold value, the robot 100 may be configured to increase the pre-set value. On the other hand, based on the similarity being smaller than the threshold value, the robot 100 may be configured to maintain and not adjust the pre-set value.

A robot control operation according to the disclosure may be performed by a robot control system comprised of a robot and a server. An operation of the robot control system will be described below.

Figure 9A:
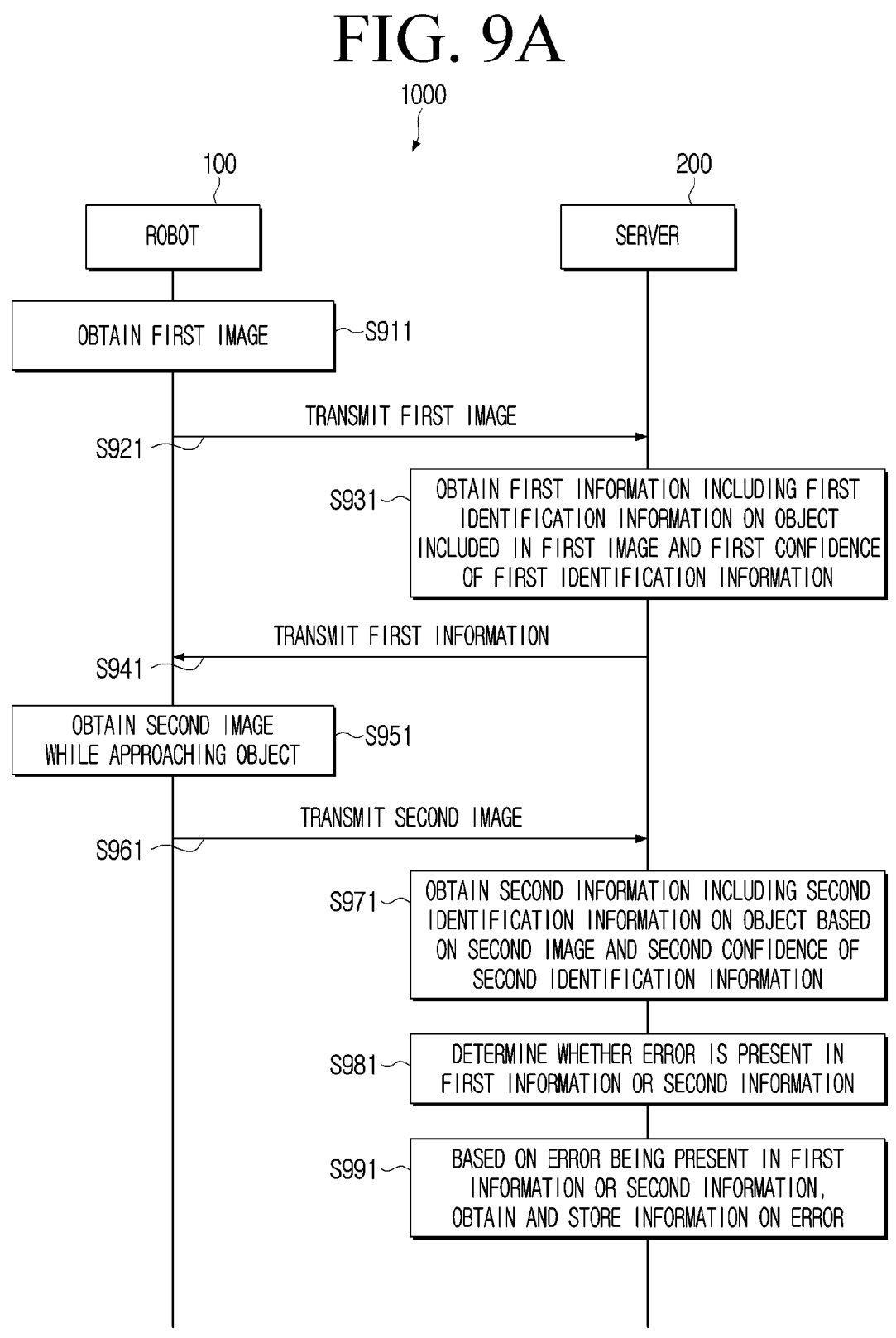
FIG. 9A is a sequence diagram illustrating an operation of a robot control system according to an embodiment of the disclosure.

FIG. 9A is a sequence diagram illustrating an operation of a robot control system according to an embodiment of the disclosure. Specifically, FIG. 9A is a sequence diagram illustrating the operation of the robot control system when the robot is operated at the first mode of collecting error information.

Referring to FIG. 9A, the robot control system 1000 may include the robot 100 and a server 200. The robot 100 may be configured to obtain the first image at operation S911, and transmit the first image to the server 200 at operation S921.

The server 200 may be configured to obtain the first information including the first identification information on the object included in the first image and the first reliability of the first identification information at operation S931. As an example, the server 200 may be configured to obtain the first information by inputting the first image to the object recognition model. Because the processor of the server 200 shows higher performance compared to the processor 150 of the robot 100, the first information may be more quickly obtained. Alternatively, the object recognition model stored in the server 200 may be greater in size than the object recognition model stored in the robot 100. Accordingly, compared to the information obtained from operations S821 and S851 in FIG. 8A, the information obtained from operations S931 and S971 may be higher in accuracy.

The server 200 may be configured to transmit the first information to the robot 100 at operation S941. The robot 100 may be configured to approach the object based on the first information, and obtain the second image while approaching the object at operation S951. Further, the robot 100 may be configured to transmit the second image to the server 200 at operation S961.

The server 200 may be configured to obtain the second information including the second identification information on the object based on the second image and the second reliability of the second identification information at operation S971. As an example, the server 200 may be configured to obtain the second information by inputting the second image to the object recognition model. Further, the server 200 may be configured to determine whether an error is present in the first information or the second information at operation S981. Because the server 200 can determine whether an error is present in the first information or the second information based on the error determination method described in FIG. 2 to FIG. 4, the detailed description thereof will be omitted. Based on an error being present in the first information or the second information, information on the error may be obtained and stored at operation S991.

Figure 9B:
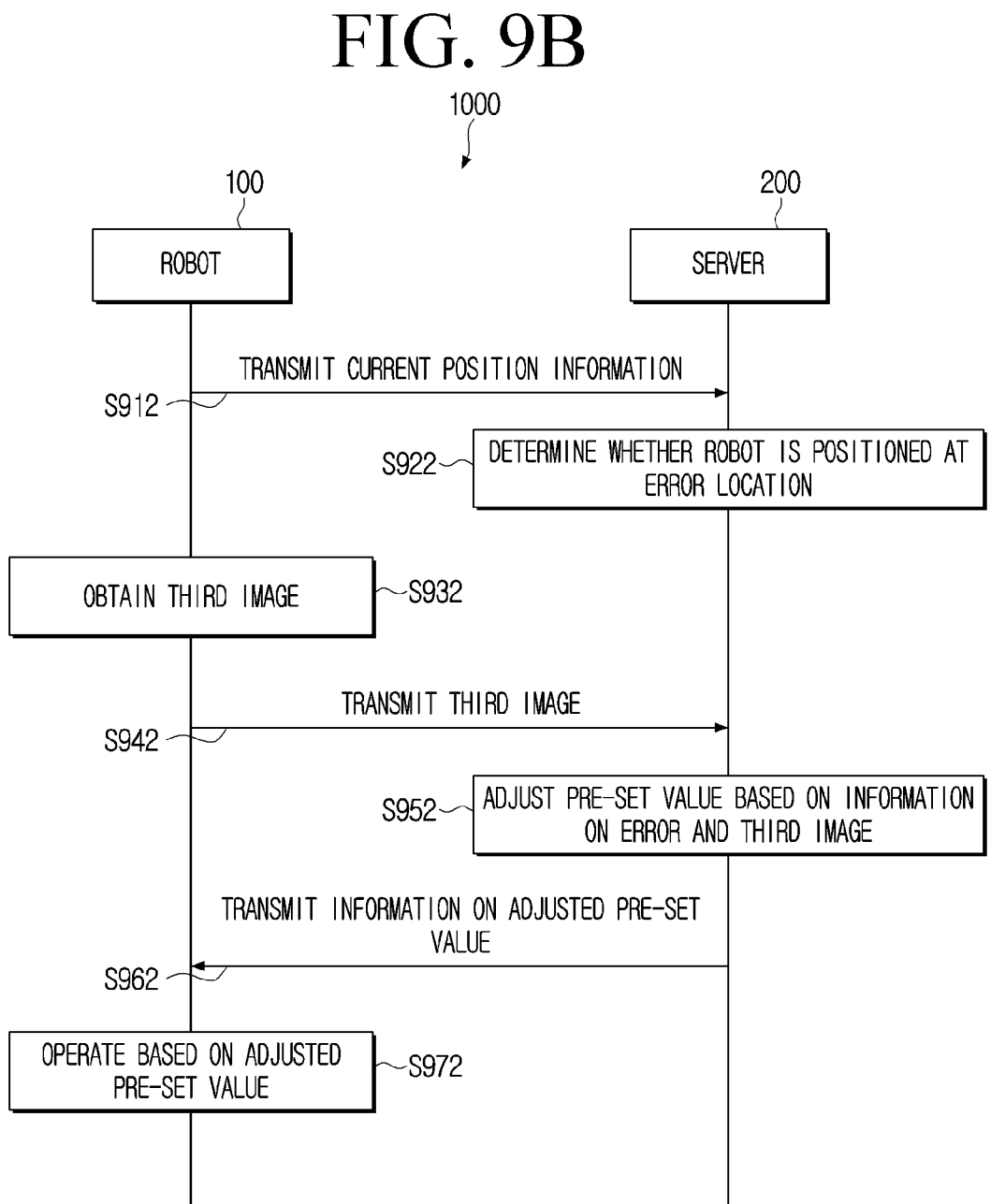
FIG. 9B is a sequence diagram illustrating an operation of a robot control system according to an embodiment of the disclosure.

FIG. 9B is a sequence diagram illustrating an operation of a robot control system according to an embodiment of the disclosure. Specifically, FIG. 9B is a sequence diagram illustrating the operation of the robot control system when the robot is operated at the second mode of performing the operation for providing service.

Referring to FIG. 9B, the robot 100 may be configured to transmit the current position information to the server 200 at operation S912. The server 200 may be configured to determine whether the robot 100 is positioned at the error location at operation S922. Because the server 200 can determine whether the robot is positioned at the error location based on the error location determining method described in FIG. 5 and FIG. 6, the detailed description thereof may be omitted. When the robot 100 is determined as positioned at the error location, the server 200 may be configured to request, to the robot 100, a captured image at the current position.

The robot 100 may be configured to obtain the third image at operation S932, and transmit the third image to the server 200 at operation S942. The server 200 may be configured to adjust the pre-set value based on the information on the error and the third image at operation S952. As an example, the server 200 may be configured to determine the similarity of the first image captured at the error location and the third image. At this time, the server 200 may be configured to input the first image and the third image to the similarity obtaining model and obtain the similarity of the first image and the third image. Based on the obtained similarity being greater than the threshold value, the server 200 may be configured to increase the pre-set value. On the other hand, based on the obtained similarity being smaller than the threshold value, the server 200 may be configured to maintain and not adjust the pre-set value. The similarity obtaining model stored in the server 200 may be greater in size than the similarity obtaining model stored in the robot 100. Accordingly, compared to the similarity obtained from operation S832 in FIG. 8A, the similarity obtained from operation S952 may be higher in accuracy.

The server 200 may be configured to transfer information on the adjusted pre-set value to the robot 100 at operation S962. Accordingly, the robot 100 may be configured to operate based on the adjusted pre-set value at operation S972. As an example, the robot 100 may be configured to perform, based on a third reliability of third identification information on the object included in the third image being greater than the adjusted pre-set value, an operation associated with the object based on the third identification information.

The one or more embodiments described above may be realized in a recordable medium which is readable by a computer or a device similar to the computer using a software, a hardware, or the combination of the software and the hardware. In some cases, embodiments described herein may be implemented by the processor itself. According to a software implementation, embodiments such as the procedures and functions described herein may be implemented with separate software modules. The respective software modules may be configured to perform one or more of the functions and operations described herein.

The computer instructions for performing processing operations according to the one or more embodiments described above may be stored in a non-transitory computer-readable medium. The computer instructions stored in this non-transitory computer-readable medium may cause a specific device to perform the processing operations according to the above-described one or more embodiments when executed by the processor.

The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a USB, a memory card, a ROM, and the like.

While the disclosure has been shown and described with reference to various embodiments thereof, it will be understood by those skilled in the art that various changes in form and details may be made therein without departing from the spirit and scope of the disclosure ss defined by the appended claims and their equivalents.

What is claimed is:

1. A robot comprising:
an image sensor;
a driving part;
a memory configured to store at least one instruction; and
a processor,
wherein the processor, when executing the at least one instruction, is configured to:
obtain a first image captured by the image sensor,
input the first image to an object recognition model and obtain first information comprising first identification information on an object comprised in the first image and a first reliability of the first identification information,
control the driving part for the robot to approach the object,
obtain a second image captured by the image sensor while the robot is approaching the object,
input the second image to the object recognition model and obtain second information comprising second identification information on the object and a second reliability of the second identification information,
determine whether an error is present in the first information by comparing the first information and the second information,
control an operation of the robot based on the determination result,
obtain a third image captured by the image sensor, and input the third image to the object recognition model and obtain third information comprising third identification information on an object in the third image and a third reliability of the third identification information, wherein a pre-set value is increased based on a determination that the object in the third image is an object other than a human, and wherein the increase of the pre-set value is configured to decrease a likelihood that the robot will approach the object of the third image.

2. The robot of claim 1, wherein the processor, when executing the at least one instruction, is further configured to determine, based on the first reliability being greater than the second reliability, that an error is present in the first information.

3. The robot of claim 1, wherein the processor, when executing the at least one instruction, is further configured to determine, based on the first identification information and the second identification information being different, that an error is present in the first information.

4. The robot of claim 1, wherein the processor, when executing the at least one instruction, is further configured to store, based on determining that an error is present in the first information, information on the error in the memory, and wherein the information on the error comprises the first image, and first position information and first direction information of the robot at a first time point at which the first image is captured.

5. The robot of claim 4, wherein the processor, when executing the at least one instruction, is further configured to:

control an operation of the robot based on the third information and the information on the error.

6. The robot of claim 5, wherein the processor, when executing the at least one instruction, is further configured to control, based on the third reliability being greater than the pre-set value, the driving part to move toward the object comprised in the third image.

7. The robot of claim 6, wherein the processor, when executing the at least one instruction, is further configured to:

obtain third position information and third direction information of the robot at a third time point at which the third image is captured, and determine whether a location at which the first image is captured corresponds to a location at which the third image is captured based on the first position information, the first direction information, the third position information, and the third direction information.

8. The robot of claim 7, wherein the processor, when executing the at least one instruction, is further configured to determine, based on a difference of the first position information and the third position information being within a threshold value, a similarity of the first image and the third image, and wherein the processor, when executing the at least one instruction, is further configured to increase, based on the similarity being greater than the threshold value, the pre-set value.

9. The robot of claim 8, wherein the processor, when executing the at least one instruction, is further configured to input the first image and the third image to a similarity obtaining model and determine a similarity of the first image and the third image.

10. A method for controlling a robot comprising an image sensor, the method comprising:

obtaining a first image captured by the image sensor;

inputting the first image to an object recognition model and obtaining first information comprising first identification information on an object comprised in the first image and a first reliability of the first identification information;

controlling the robot to approach the object;

obtaining a second image captured by the image sensor while the robot approaches the object;

inputting the second image to the object recognition model and obtaining second information comprising second identification information on the object and a second reliability of the second identification information;

determining whether an error is present in the first information by comparing the first information and the second information;

controlling an operation of the robot based on the determination result;

obtaining a third image captured by the image sensor; and inputting the third image to the object recognition model and obtain third information comprising third identification information on an object in the third image and a third reliability of the third identification information, wherein a pre-set value is increased based on a determination that the object in the third image is an object other than a human, and wherein the increase of the pre-set value is configured to decrease a likelihood that the robot will approach the object of the third image.

11. The method of claim 10, wherein the determining comprises determining, based on the first reliability being greater than the second reliability, that an error is present in the first information.

12. The method of claim 10, wherein the determining comprises determining, based on the first identification information and the second identification information being different, that an error is present in the first information.

13. The method of claim 10, further comprising:

storing, based on determining that an error is present in the first information, information on the error in a memory, wherein the information on the error includes the first image, and first position information and first direction information of the robot at a first time point at which the first image is captured.

14. The method of claim 13, further comprising:

controlling an operation of the robot based on the third information and the information on the error.

15. The method of claim 14, further comprising:

controlling, based on the third reliability being greater than the pre-set value, the robot to move toward the object comprised in the third image.

* * * * *